US012562856B2

(12) United States Patent
Huang et al.

(10) Patent No.: US 12,562,856 B2
(45) Date of Patent: Feb. 24, 2026

(54) INTER PANEL RECEPTION AT UE

(71) Applicant: MEDIATEK INC., Hsinchu (TW)

(72) Inventors: Tun-Ping Huang, Hsinchu (TW); Jiaxian Pan, Hsinchu (TW); Bao-Chi Peng, Hsinchu (TW); Fei Xu, Beijing (CN); Yaochao Liu, Beijing (CN); Wei-Jen Chen, Hsinchu (TW); Chong-You Lee, Hsinchu (TW); Yabo Li, San Jose, CA (US); Wei Yu Lai, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 449 days.

(21) Appl. No.: 18/091,532

(22) Filed: Dec. 30, 2022

(65) Prior Publication Data

US 2023/0216620 A1 Jul. 6, 2023

Related U.S. Application Data

(60) Provisional application No. 63/296,013, filed on Jan. 3, 2022, provisional application No. 63/294,883, filed on Dec. 30, 2021.

(30) Foreign Application Priority Data

Dec. 20, 2022 (CN) .......................... 202211643852.3

(51) Int. Cl.
H04L 5/00 (2006.01)
H04W 24/10 (2009.01)
H04W 48/20 (2009.01)
(52) U.S. Cl.
CPC ........... H04L 5/001 (2013.01); H04L 5/0051 (2013.01); H04W 24/10 (2013.01); H04W 48/20 (2013.01)

(58) Field of Classification Search
None
See application file for complete search history.

(56) References Cited

U.S. PATENT DOCUMENTS

2015/0173009 A1 6/2015 Vallath et al.
2018/0287870 A1* 10/2018 Yerramalli ............ H04L 5/0064
(Continued)

FOREIGN PATENT DOCUMENTS

CN 102113366 A 6/2011
CN 102204386 A 9/2011

OTHER PUBLICATIONS

China Patent Office, "Office Action", May 27, 2025, China.

*Primary Examiner* — Jeffrey M Rutkowski
*Assistant Examiner* — Justin Michael Whitaker
(74) *Attorney, Agent, or Firm* — Troutman Pepper Locke LLP; Tim Tingkang Xia, Esq.

(57) ABSTRACT

In an aspect of the disclosure, a method, a computer-readable medium, and an apparatus are provided. The apparatus may be a UE. The UE receives, from a base station, a configuration specifying an initial aggregated bandwidth $W_0$ carried on $C_0$ component carriers on which a reception unit (RXU) of the UE is to receive signals. The UE determines a total bandwidth $W_{TOT}$ on which the UE is capable of receiving signals. The UE determines, based on $W_{TOT}$ and $W_0$, an initial hardware limit of $Q_0'$ RXUs that the UE is allowed to activate concurrently. The UE determines an adjusted aggregated bandwidth $W_1$ carried on $C_1$ component carriers on which an RXU of the UE is to receive signals based on a channel condition between the UE and the base station.

19 Claims, 9 Drawing Sheets

(56) References Cited

U.S. PATENT DOCUMENTS

| | | | |
|---|---|---|---|
| 2020/0029357 A1* | 1/2020 | Shepard | H04W 68/02 |
| 2020/0092068 A1* | 3/2020 | Yang | H04W 52/06 |
| 2022/0104052 A1* | 3/2022 | Xu | H04B 7/0413 |
| 2022/0217042 A1* | 7/2022 | Santhanam | H04B 7/0404 |

* cited by examiner

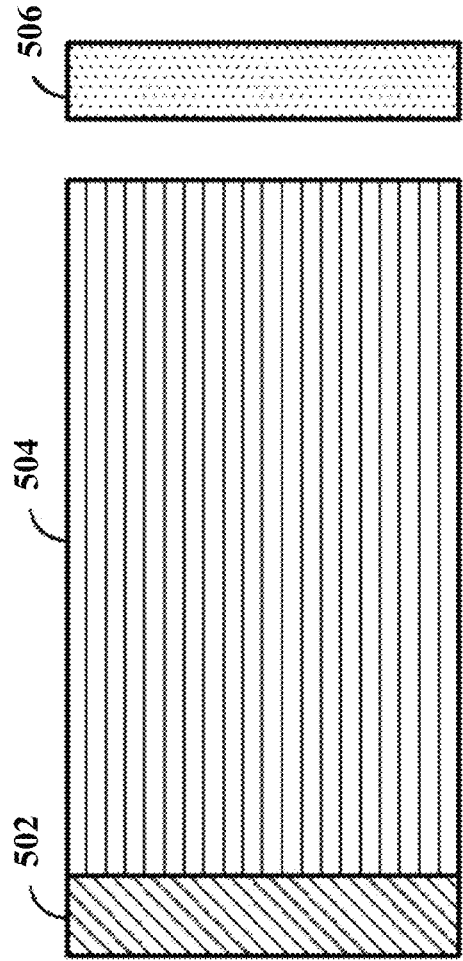
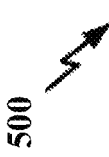
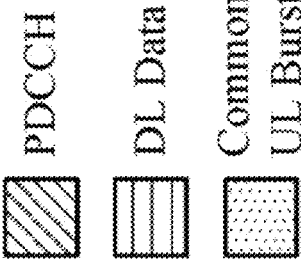
FIG. 5

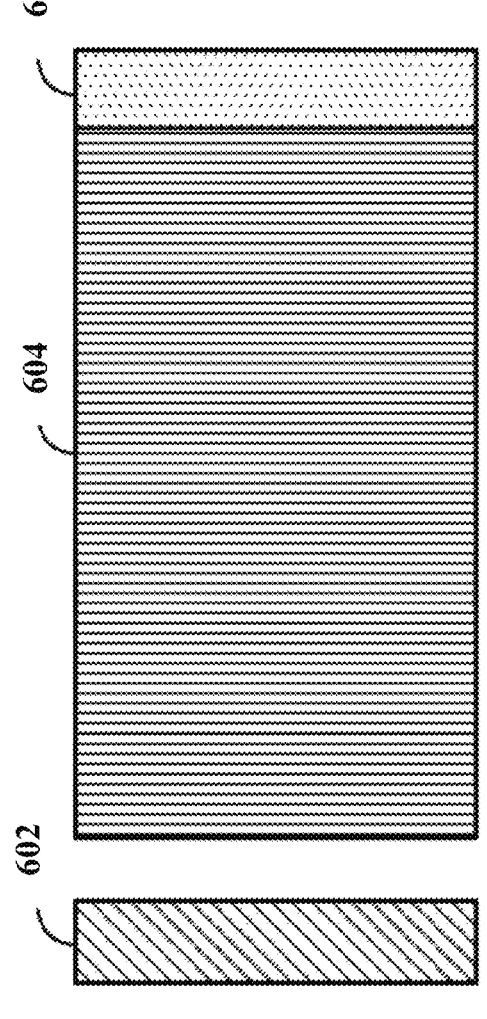
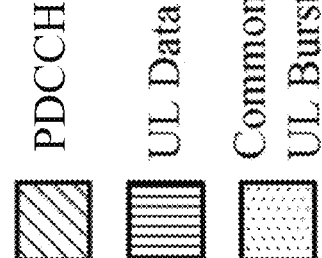
FIG. 6

800

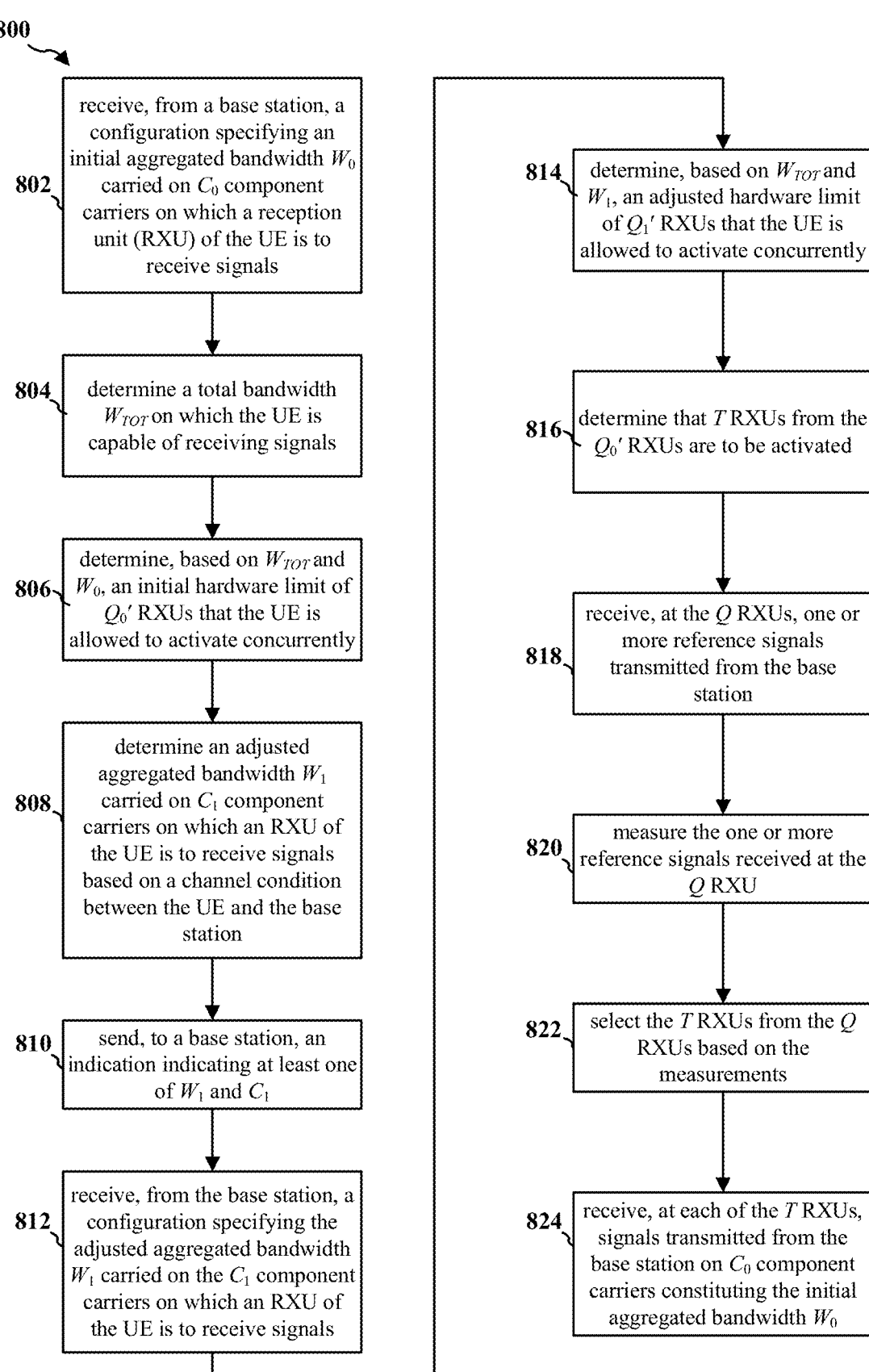

802 — receive, from a base station, a configuration specifying an initial aggregated bandwidth $W_0$ carried on $C_0$ component carriers on which a reception unit (RXU) of the UE is to receive signals 804 — determine a total bandwidth $W_{TOT}$ on which the UE is capable of receiving signals 806 — determine, based on $W_{TOT}$ and $W_0$, an initial hardware limit of $Q_0'$ RXUs that the UE is allowed to activate concurrently 808 — determine an adjusted aggregated bandwidth $W_1$ carried on $C_1$ component carriers on which an RXU of the UE is to receive signals based on a channel condition between the UE and the base station 810 — send, to a base station, an indication indicating at least one of $W_1$ and $C_1$ 812 — receive, from the base station, a configuration specifying the adjusted aggregated bandwidth $W_1$ carried on the $C_1$ component carriers on which an RXU of the UE is to receive signals 814 — determine, based on $W_{TOT}$ and $W_1$, an adjusted hardware limit of $Q_1'$ RXUs that the UE is allowed to activate concurrently 816 — determine that $T$ RXUs from the $Q_0'$ RXUs are to be activated 818 — receive, at the $Q$ RXUs, one or more reference signals transmitted from the base station 820 — measure the one or more reference signals received at the $Q$ RXU 822 — select the $T$ RXUs from the $Q$ RXUs based on the measurements 824 — receive, at each of the $T$ RXUs, signals transmitted from the base station on $C_0$ component carriers constituting the initial aggregated bandwidth $W_0$

FIG. 8

INTER PANEL RECEPTION AT UE

CROSS-REFERENCE TO RELATED APPLICATION(S)

This application claims the benefits of U.S. Provisional Application Ser. No. 63/294,883, entitled "Inter-Panel MIMO" and filed on Dec. 30, 2021 and U.S. Provisional Application Ser. No. 63/296,013, entitled "NR FR2 UE reception with 2 Panels" and filed on Jan. 3, 2022. This application also claims priority to Chinese Patent Application 202211643852.3, filed on Dec. 20, 2022. The contents of all the applications above are expressly incorporated by reference herein in their entirety.

BACKGROUND

Field

The present disclosure relates generally to communication systems, and more particularly, to techniques of inter panel reception at user equipment (UE) of signals transmitted from a base station.

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The UE receives, from a base station, a configuration specifying an initial aggregated bandwidth $W_0$ carried on $C_0$ component carriers on which a reception unit (RXU) of the UE is to receive signals. The UE determines a total bandwidth $W_{TOT}$ on which the UE is capable of receiving signals. The UE determines, based on $W_{TOT}$ and $W_0$, an initial hardware limit of $Q_0'$ RXUs that the UE is allowed to activate concurrently. The UE determines an adjusted aggregated bandwidth $W_1$ carried on $C_1$ component carriers on which an RXU of the UE is to receive signals based on a channel condition between the UE and the base station.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 5 is a diagram showing an example of a DL-centric slot.

FIG. 6 is a diagram showing an example of an UL-centric slot.

FIG. 8 is a flow chart of a method (process) for adjusting aggregated bandwidth.

DETAILED DESCRIPTION

Figure 1:
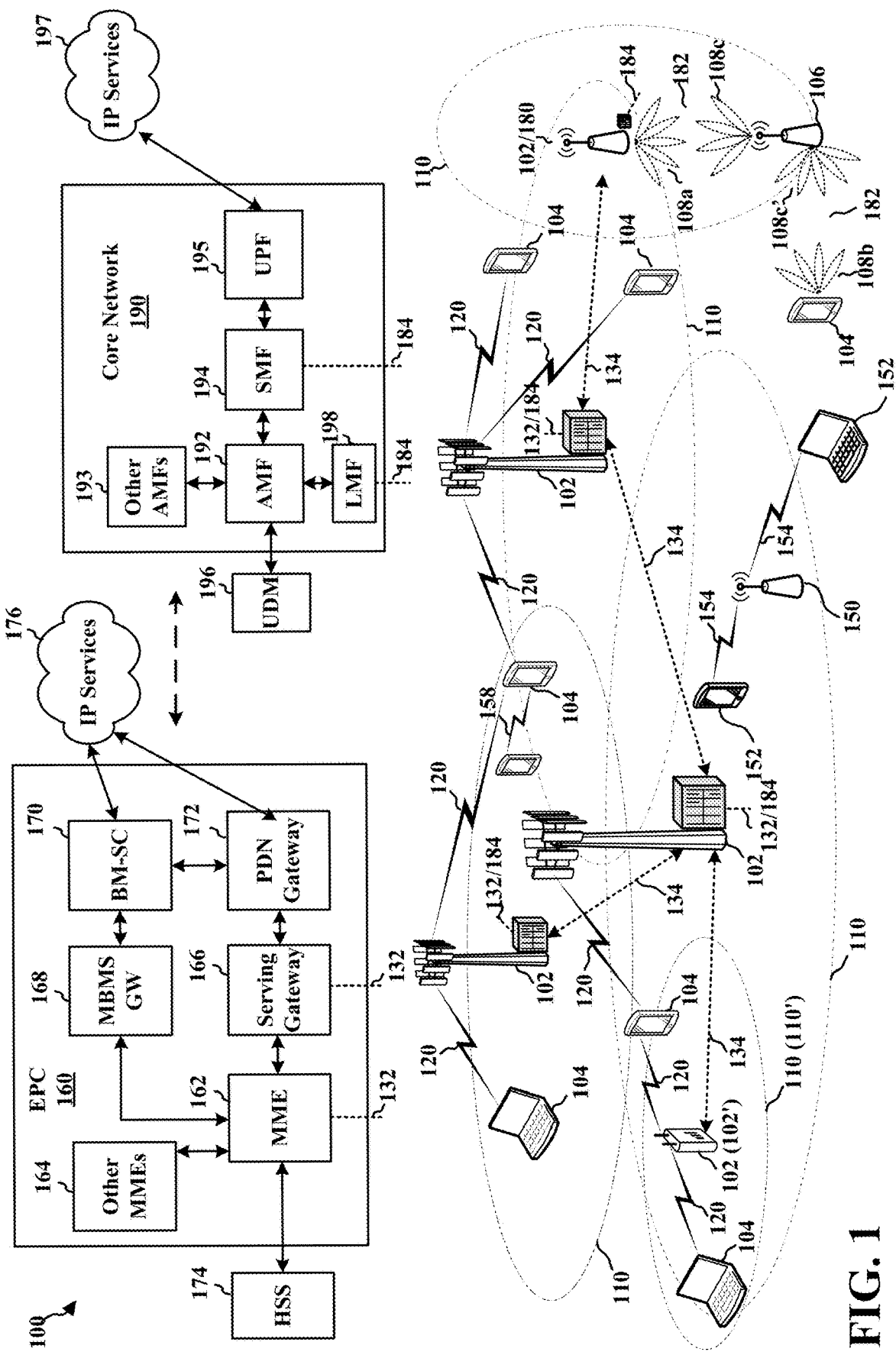
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Z MHZ (e.g., 5, 10, 15, 20, 100, 400, etc. MHz) bandwidth per carrier allocated in a carrier aggregation of up to a total of Z*V MHz (V component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102″ may employ NR and use the same 5 GHZ unlicensed frequency spectrum as used by the Wi-Fi AP 150. The small cell 102′, employing NR in an unlicensed frequency spectrum, may boost coverage to and/or increase capacity of the access network.

A base station 102, whether a small cell 102′ or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHZ with a wavelength of 100 millimeters. The super high frequency (SHF) band extends between 3 GHZ and 30 GHZ, also referred to as centimeter wave. Communications using the mmW/near mmW radio frequency band (e.g., 3 GHZ-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 108a. The UE 104 may receive the beamformed signal from the base station 180 in one or more receive directions 108b. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a location management function (LMF) 198, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the SMF 194 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may reference 5G New Radio (NR), the present disclosure may be applicable to other similar areas, such as LTE, LTE-Advanced (LTE-A), Code Division Multiple Access (CDMA), Global System for Mobile communications (GSM), or other wireless/radio access technologies.

Figure 2:
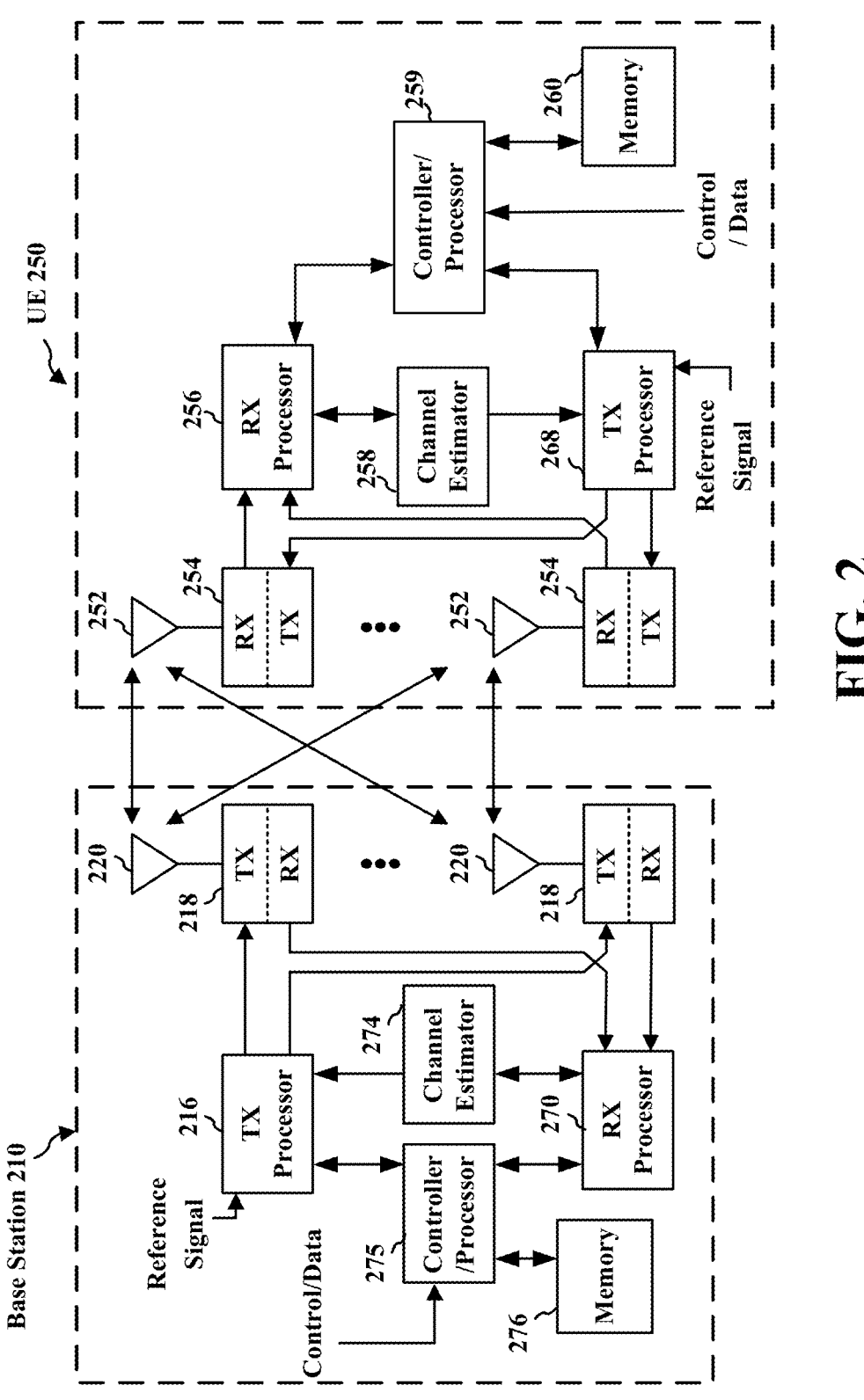
FIG. 2 is a diagram illustrating a base station in communication with a UE in an access network.

FIG. 2 is a block diagram of a base station 210 in communication with a UE 250 in an access network. In the DL, IP packets from the EPC 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting: PDCP layer functionality associated with header compression/decompression, security (ciphering, deciphering, integrity protection, integrity verification), and handover support functions: RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the EPC 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting: PDCP layer functionality associated with header compression/decompression, and security (ciphering, deciphering, integrity protection, integrity verification): RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250). Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the EPC 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHZ), massive MTC (mMTC) targeting non-backward compatible MTC techniques, and/or mission critical targeting ultra-reliable low latency communications (URLLC) service.

A single component carrier bandwidth of 100 MHZ (or other suitable bandwidths) may be supported. In one example, NR resource blocks (RBs) may span 12 sub-carriers with a sub-carrier spacing (SCS) of 60 kHz over a 0.25 ms duration or a SCS of 30 kHz over a 0.5 ms duration (similarly, 50 MHz BW for 15 kHz SCS over a 1 ms duration). Each radio frame may consist of 10 subframes (10, 20, 40 or 80 NR slots) with a length of 10 ms. Each slot may indicate a link direction (i.e., DL or UL) for data transmission and the link direction for each slot may be dynamically switched. Each slot may include DL/UL data as well as DL/UL control data. UL and DL slots for NR may be as described in more detail below with respect to FIGS. 5 and 6.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
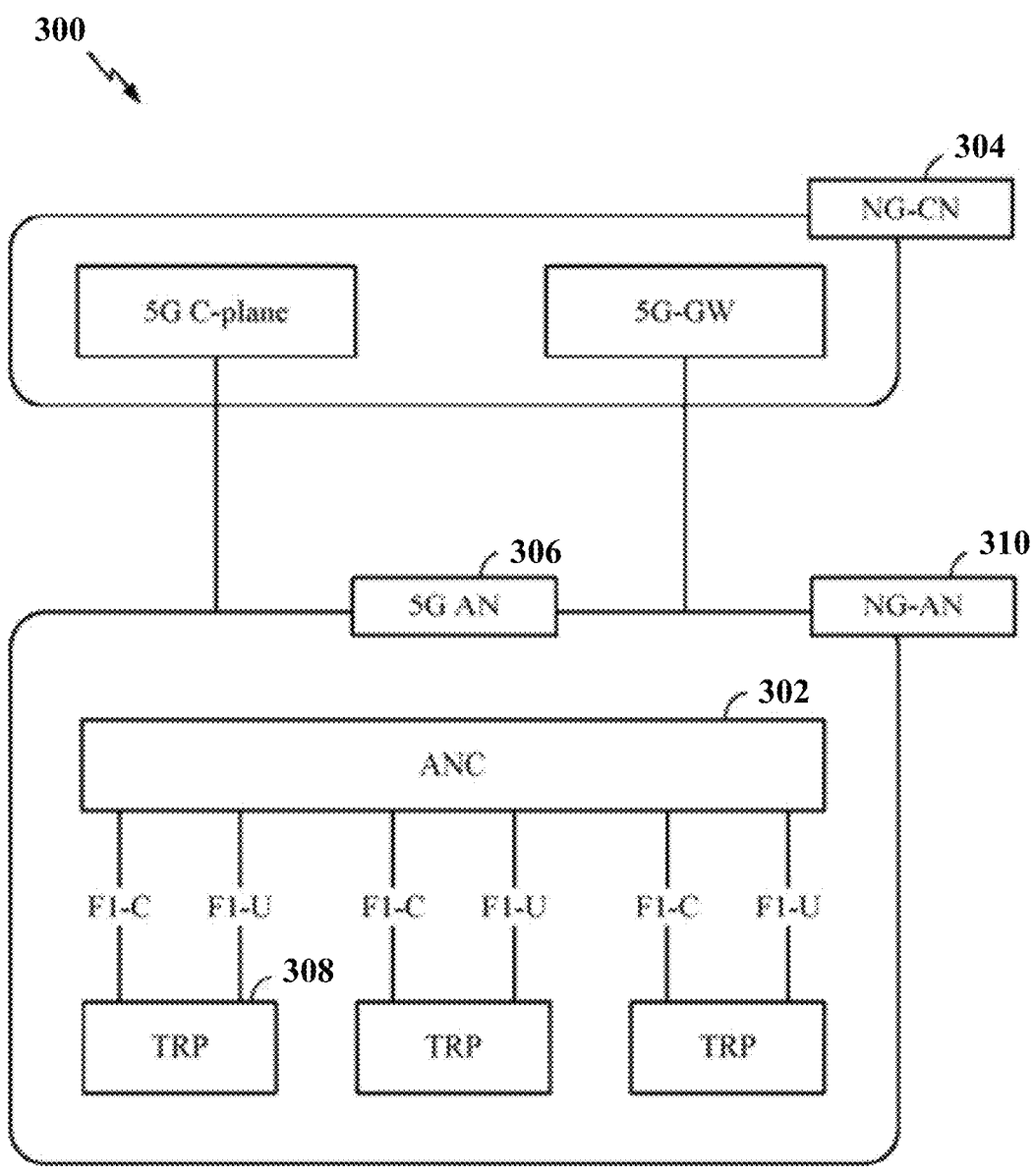
FIG. 3 illustrates an example logical architecture of a distributed access network.

FIG. 3 illustrates an example logical architecture of a distributed RAN 300, according to aspects of the present disclosure. A 5G access node 306 may include an access node controller (ANC) 302. The ANC may be a central unit (CU) of the distributed RAN. The backhaul interface to the next generation core network (NG-CN) 304 may terminate at the ANC. The backhaul interface to neighboring next generation access nodes (NG-ANs) 310 may terminate at the ANC. The ANC may include one or more TRPs 308 (which may also be referred to as BSs, NR BSs, Node Bs, 5G NBs, APs, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific ANC deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
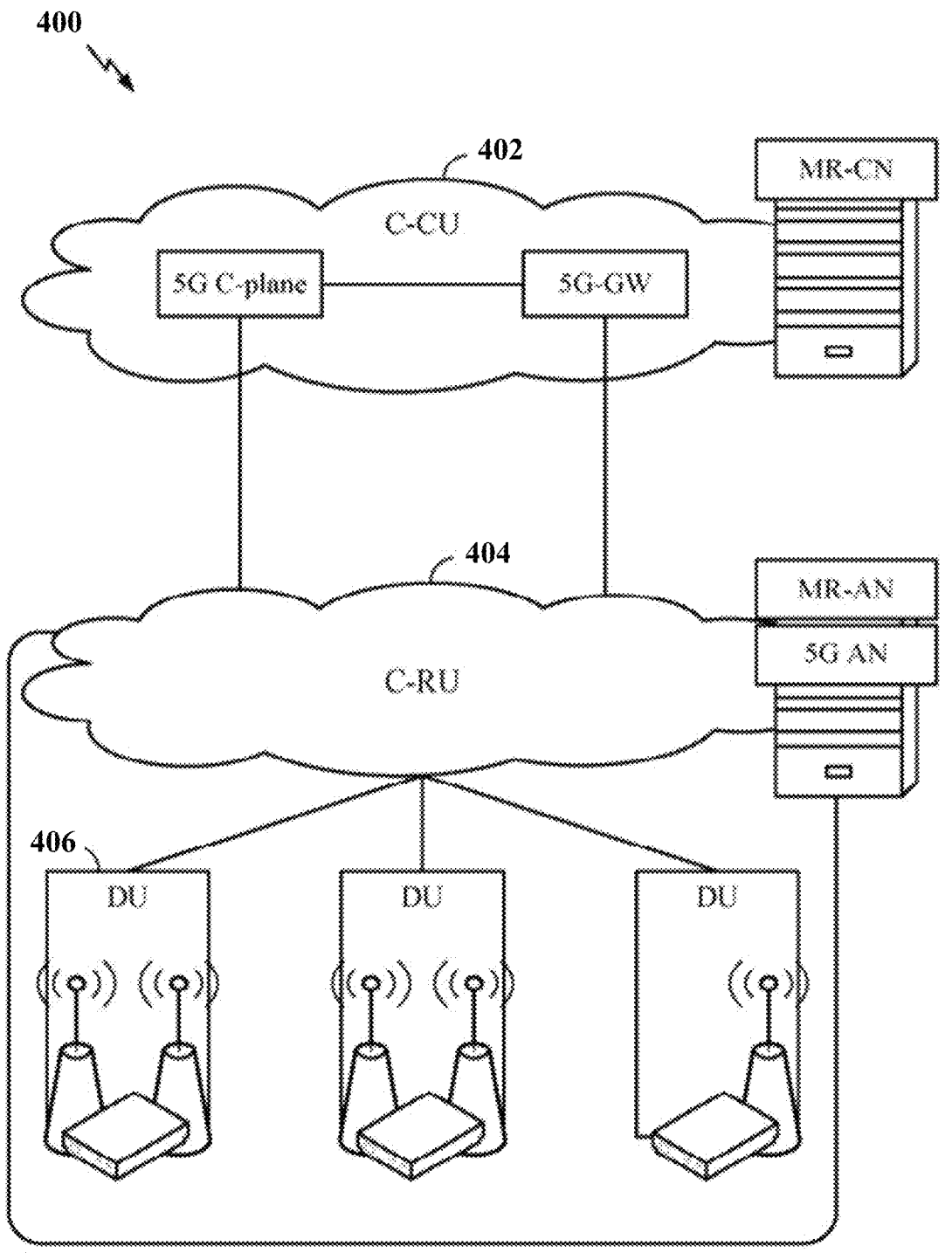
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

FIG. 5 is a diagram 500 showing an example of a DL-centric slot. The DL-centric slot may include a control portion 502. The control portion 502 may exist in the initial or beginning portion of the DL-centric slot. The control portion 502 may include various scheduling information and/or control information corresponding to various portions of the DL-centric slot. In some configurations, the control portion 502 may be a physical DL control channel (PDCCH), as indicated in FIG. 5. The DL-centric slot may also include a DL data portion 504. The DL data portion 504 may sometimes be referred to as the payload of the DL-centric slot. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric slot may also include a common UL portion 506. The common UL portion 506 may sometimes be referred to as an UL burst, a common UL burst, and/or various other suitable terms. The common UL portion 506 may include feedback information corresponding to various other portions of the DL-centric slot. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric slot and alternative structures having similar features may exist without necessarily deviating from the aspects described herein.

FIG. 6 is a diagram 600 showing an example of an UL-centric slot. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an UL data portion 604. The UL data portion 604 may sometimes be referred to as the pay load of the UL-centric slot. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric slot may also include a common UL portion 606. The common UL portion 606 in FIG. 6 may be similar to the common UL portion 506 described above with reference to FIG. 5. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric slot and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Figure 7:
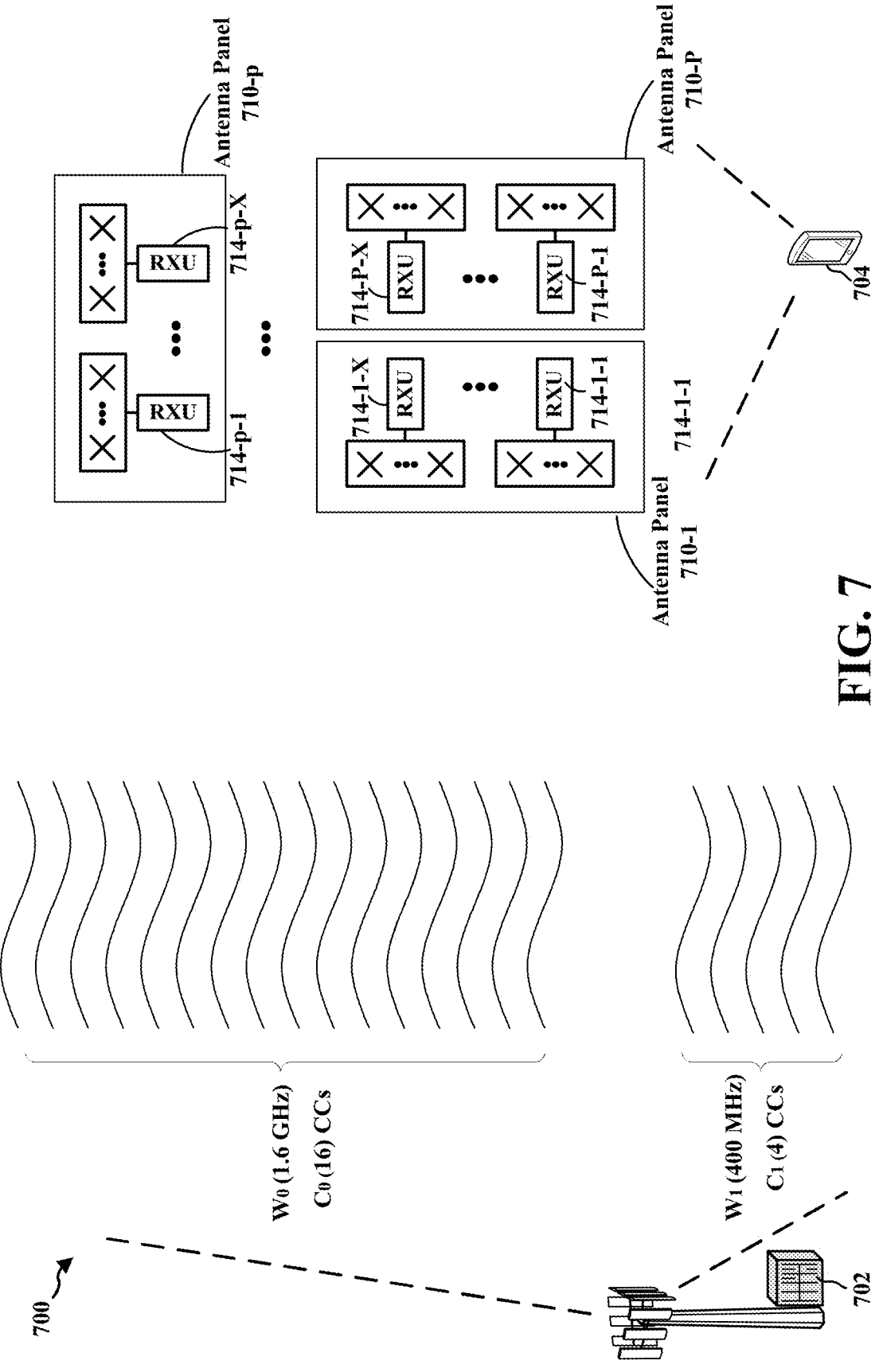
FIG. 7 is a diagram illustrating reception at a UE of signals transmitted from a base station.

FIG. 7 is a diagram 700 illustrating reception at a UE of signals transmitted from a base station. In this example, a UE 704 has antenna panels 710-1 . . . 710-$p$ . . . 710-P that may be in different orientations. Further, each antenna panel may have X RXUs each connected with one or more antennas. For example, the antenna panel 710-$p$ has X RXUs 714-$p$-1 . . . 714-$p$-X. RF signals received at the antennas connected to a particular RXU are sent to that particular RXU for processing.

A base station 702 may send, to the UE 704, a configuration specifying a bandwidth $W_0$ carried on $C_0$ component carriers on which an RXU of the UE 704 is to receive signals. In this example, $W_0$ is 1.6 GHZ, and $C_0$ is 16. Each component carrier has a bandwidth of 100 MHz. In other examples, different component carriers may have different bandwidths. Further, the UE 704 has Q RXUs in total.

The UE 704 has a maximum total bandwidth $W_{TOT}$ on which the UE 704 is capable of receiving signals. $W_{TOT}$ is a hardware limit of the UE 704. In this example, $W_{TOT}$ is 3.2 GHZ. Based on $W_{TOT}$ and $W_0$, the UE 704 can determine a maximum of $Q_0'$ RXUs that the UE is allowed to activate concurrently. That is: $W_{TOT}=W_0*Q_0'$. In this example, $Q_0'$ is 2. The UE 704 may select, based on certain rules, one or two RXUs (in this example) from the Q RXUs to receive the signals on $C_0$ (e.g., 16) component carriers transmitted from the base station 702.

To reduce cost and power consumption, typically at a time the UE 704 activates (turns on) RXUs on the same panel only. The UE 704 may activate the antenna panel with the highest RSRP. The antenna panel with the highest RSRP changes over time due to UE mobility, rotation, and environment blockage. Accordingly, the UE 704 needs to switch to other antenna panels. The UE 704 determines when to measure RSRPs on other antenna panels to find the best antenna panel based on certain criteria (e.g., periodically or when the RSRP of the active panel is less than a threshold).

In certain configurations, panel switching is subject to latency in an order of 100 ms, during which the received signals at the UE become unstable. Frequent panel switching may significantly reduce throughput. If the signals arrive at the UE from multiple angles due to serious environment reflection and scattering, the UE suffers from performance degradation if restricted to receiving these signals only at one single active panel.

In certain configurations, the UE 704 has the capability to turn on multiple antenna panels at the same time. As such, the UE 704 does not need to switch antenna panels, therefore not suffering the panel switching latency. In addition, activating multiple panels can potentially improve SNRs of the received signals, which may significantly increase throughput, enhance performance at a cell edge, and enlarge the cell coverage.

Nonetheless, it may be inflexible to (de) activate RXUs in a granularity of antenna panels. In certain configurations, the UE 704 can turn on a subset of RXUs (e.g., 2 RXUs) across different antenna panels for transmission or reception. Thus, the UE 704 can receive signals from multiple angles of arrival (AoAs), while avoiding excessive power consumption.

In a first scenario, the UE 704 may determine that it is at the cell edge where receiving SNR is low: The UE 704 may determine that it is in rapid movement and/or rotation and that it is difficult for the UE 704 to maintain good signal quality at a given antenna panel. Further, some of the UE 704's antenna panels may be blocked by obstacles. As such, the UE 704 may determine (a) that a channel condition between the base station and the UE is worse than a corresponding threshold, (b) that a movement of the UE is faster than a corresponding threshold, or (c) that a rotation of the UE is more rapid than a corresponding threshold. Further, the UE 704 may determine that the initial aggregated bandwidth $W_0$ configured by the base station 702 is greater than a corresponding threshold and/or that the maximum active RXU number $Q_0'$ is less than a corresponding threshold. In other words, the UE 704 determines that the current aggregated bandwidth $W_0$ per RXU is too large and the maximum number of concurrent active RXUs $Q_0'$ is too small.

In a second scenario, the UE 704 may determine that it is at the cell center where receiving SNR is high. The UE 704 may determine that it is static and no frequent antenna panel switching is needed. The UE 704 may determine that it is not blocked by obstacles. As such, the UE 704 may determine (a) that a channel condition between the base station and the UE is better than a corresponding threshold, (b) that a movement of the UE is slower than a corresponding threshold, or (c) that a rotation of the UE is slower than a corresponding threshold. Further, the UE 704 may determine that the initial aggregated bandwidth $W_0$ configured by the base station 702 is less than a corresponding threshold and/or that the maximum active RXU number $Q_0'$ is greater less than a corresponding threshold. In other words, the UE 704 determines that the current aggregated bandwidth $W_0$ per RXU is too small and the maximum number of concurrent active RXUs $Q_0'$ is too large.

The UE 704 may determine, based on the channel conditions described supra, a preferred aggregated bandwidth $W_1$ carried on $C_1$ component carriers on which an RXU of the UE 704 is to receive signals. In this example, initially the UE 704 only uses the RXU 714-1-1 and the connected antennas to receive signals carried on the $C_0$ (e.g., 16) component carriers in an aggregated bandwidth $W_0$ (e.g., 1.6 GHZ).

The UE 704 measures reference signals transmitted on the $C_0$ component carriers to determine an SNR. The UE 704 further determines that the measured SNR is in a range that correspond to an aggregated bandwidth of 400 MHZ on $C_1$ (e.g., 4) component carriers for better signal qualities. Accordingly, the UE 704 determines that 400 MHz is a preferred aggregated bandwidth per RXU.

The UE 704 may send, to the base station 702, an indication indicating the preferred aggregated bandwidth $W_1$ and the corresponding number (e.g., $C_1$) of component carriers. In one configuration, the UE 704 may use UE Assistance Information (UAI) as defined in 3GPP standards to send the indication.

In response to receiving the indication from the UE 704, the base station 702 may send, to the base station 702, a configuration specifying the preferred aggregated bandwidth $W_1$ carried on the $C_1$ component carriers on which an RXU of the UE 704 is to receive signals. After receiving the configuration, the UE 704 activates one or more RXUs according to the preferred aggregated bandwidth as described infra.

The UE 704 determines, based on $W_{TOT}$ and $W_1$, a preferred hardware limit of $Q_1'$ RXUs that the UE is allowed to activate concurrently. In this example, as $W_{TOT}$ is 3.2 GHz and $W_1$ is 400 MHZ, $Q_1'$ is 8. In other words, the UE 704 at most may active 8 RXUs to receive signals on the $C_1$ component carriers concurrently. Further, based on other criteria (e.g., total power consumption), the UE 704 may determine to only use T RXUs, which are not greater than the preferred hardware limit of $Q_1'$ RXUs.

In a first technique, the base station 702 transmits the signals on the $C_1$ component carriers on one or more transmission beams. The transmission beams may be coarse beams or fine beams. The UE 704 adjusts the antennas on the antenna panels 710-1 . . . 710-$p$ . . . 710-P in accordance with predefined configurations to receive those transmission beams on coarse reception beams. For example, a predefined antenna weighting vector (AWV) is applied to 1 or 2 antennas connected to that RXU. The UE 704 activates one or more of the Q RXUs at a time to receive the reference signals on the $C_1$ component carriers, until each of the Q RXUs has been activated once. The reference signals may be SSB, TRS, CSI-RS, and/or DMRS. The UE 704 measures the qualities of the reference signals (e.g., RSRP, SNR, or MI) received at each RXU. The UE 704 compares the qualities of the reference signals from all Q RXUs to select the top T RXUs. The T RXUs can be selected from across all antenna panels 710-1 . . . 710-$p$ . . . 710-P and without the constraint that the activated RXUs are from the same antenna panel. Subsequently, the UE 704 activates the selected T RXUs, which concurrently receives the signals on the $C_1$ component carriers transmitted from the base station 702.

In a second technique, the base station 702 transmits the signals on the $C_1$ component carriers on one or more transmission beams. The transmission beams may be coarse beams or fine beams. The UE 704 adjusts the antennas on the antenna panels 710-1 . . . 710-$p$ . . . 710-P in accordance with some beamforming methods to receive those transmission beams on fine reception beams. For example, an AWV (e.g., selected/generated based on the channel condition) is applied to most or all antennas connected to that RXU. The beamforming method can be optimized per RXU or jointly by multiple RXUs. The UE 704 activates one or more of the Q RXUs at a time to receive the reference signals on the $C_1$ component carriers, until each of the Q RXUs has been activated once. The reference signals may be SSB, TRS, CSI-RS, and/or DMRS. The UE 704 measures the qualities of the reference signals (e.g., RSRP, SNR, or MI) received at each RXU. The UE 704 compares the qualities of the reference signals from all Q RXUs to select the top T RXUs. The T RXUs can be selected from across all antenna panels 710-1 . . . 710-$p$ . . . 710-P and without the constraint that the activated RXUs are from the same antenna panel. Subsequently, the UE 704 activates the selected T RXUs, which concurrently receives the signals on the $C_1$ component carriers transmitted from the base station 702.

FIG. 8 is a flow chart 800 of a method (process) for adjusting aggregated bandwidth. The method may be performed by a UE (e.g., the UE 704). At operation 802, the UE receives, from a base station, a configuration specifying an initial aggregated bandwidth $W_0$ carried on $C_0$ component carriers on which an RXU of the UE is to receive signals. At operation 804, the UE determines a total bandwidth $W_{TOT}$ on which the UE is capable of receiving signals. At operation 806, the UE determines, based on $W_{TOT}$ and $W_0$, an initial hardware limit of $Q_0'$ RXUs that the UE is allowed to activate concurrently. At operation 808, the UE determines an adjusted aggregated bandwidth $W_1$ carried on $C_1$ component carriers on which an RXU of the UE is to receive signals based on a channel condition between the UE and the base station.

At operation 810, the UE sends, to the base station, an indication indicating at least one of $W_1$ and $C_1$. In certain configurations, the indication is sent to the base station as UE Assistance Information (UAI). At operation 812, the UE receives, from the base station, a configuration specifying the adjusted aggregated bandwidth $W_1$ carried on the C'1 component carriers on which an RXU of the UE is to receive signals.

At operation 814, the UE determines, based on $W_{TOT}$ and $W_1$, an adjusted hardware limit of $Q_1'$ RXUs that the UE is allowed to activate concurrently. At operation 816, the UE determines that T RXUs from the $Q_0'$ RXUs are to be activated. T is a positive integer and not greater than $Q_0'$.

In certain configurations, the UE has Q RXUs in total. Q is an integer not less than $Q_0'$. At operation 818, the UE receives, at the Q RXUs, one or more reference signals transmitted from the base station. At operation 820, the UE measures the one or more reference signals received at the Q RXU. At operation 822, the UE selects the T RXUs from the Q RXUs based on the measurements. At operation 824, the UE receives, at each of the T RXUs, signals transmitted from the base station on $C_0$ component carriers constituting the initial aggregated bandwidth $W_0$.

In certain configurations, the respective one or more reference signals are in coarse beams transmitted from the base station. In certain configurations, the respective one or more reference signals are in coarse beams received at the UE. In certain configurations, the respective one or more reference signals are in fine beams transmitted from the base station. In certain configurations, the respective one or more reference signals are in fine beams received at the UE.

In certain configurations, prior to determining the adjusted aggregated bandwidth $W_1$, the UE determines (a) that a channel condition between the base station and the UE is worse than a first threshold, (b) that a movement of the UE is faster than a second threshold, or (c) that a rotation of the UE is more rapid than a third threshold. The UE further determines that $Q_1'$ is greater than a fourth threshold.

In certain configurations, prior to determining the adjusted aggregated bandwidth $W_1$, the UE determines (a) that a channel condition between the base station and the UE is better than a first threshold, (b) that a movement of the UE is slower than a second threshold, or (c) that a rotation of the UE is slower than a third threshold. The UE further determines that $Q_1'$ is less than a fourth threshold.

Figure 9:
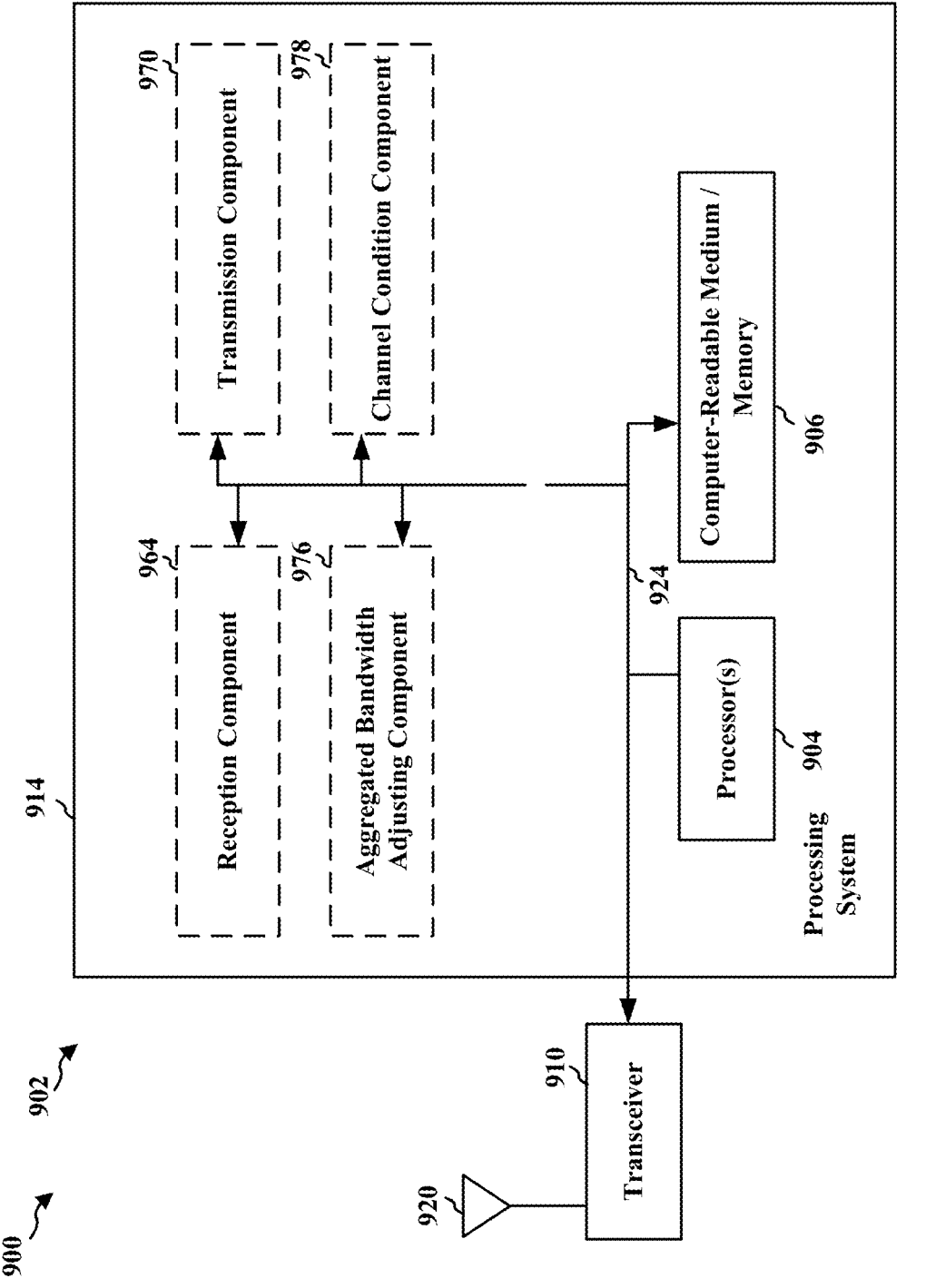
FIG. 9 is a diagram illustrating an example of a hardware implementation for an apparatus employing a processing system.

FIG. 9 is a diagram 900 illustrating an example of a hardware implementation for an apparatus 902 employing a processing system 914. The apparatus 902 may be a UE. The processing system 914 may be implemented with a bus architecture, represented generally by a bus 924. The bus 924 may include any number of interconnecting buses and bridges depending on the specific application of the processing system 914 and the overall design constraints. The bus 924 links together various circuits including one or more processors and/or hardware components, represented by one or more processors 904, a reception component 964, a transmission component 970, an aggregated bandwidth adjusting component 976, a channel condition component 978, and a computer-readable medium/memory 906. The bus 924 may also link various other circuits such as timing sources, peripherals, voltage regulators, and power management circuits, etc.

The processing system 914 may be coupled to a transceiver 910, which may be one or more of the transceivers 254. The transceiver 910 is coupled to one or more antennas 920, which may be the communication antennas 252.

The transceiver 910 provides a means for communicating with various other apparatus over a transmission medium. The transceiver 910 receives a signal from the one or more antennas 920, extracts information from the received signal, and provides the extracted information to the processing system 914, specifically the reception component 964. In addition, the transceiver 910 receives information from the processing system 914, specifically the transmission component 970, and based on the received information, generates a signal to be applied to the one or more antennas 920.

The processing system 914 includes one or more processors 904 coupled to a computer-readable medium/memory 906. The one or more processors 904 are responsible for general processing, including the execution of software stored on the computer-readable medium/memory 906. The software, when executed by the one or more processors 904, causes the processing system 914 to perform the various functions described supra for any particular apparatus. The computer-readable medium/memory 906 may also be used for storing data that is manipulated by the one or more processors 904 when executing software. The processing system 914 further includes at least one of the reception component 964, the transmission component 970, the aggregated bandwidth adjusting component 976, and the channel condition component 978. The components may be software components running in the one or more processors 904, resident/stored in the computer readable medium/memory 906, one or more hardware components coupled to the one or more processors 904, or some combination thereof. The processing system 914 may be a component of the UE 250 and may include the memory 260 and/or at least one of the TX processor 268, the RX processor 256, and the communication processor 259.

In one configuration, the apparatus 902 for wireless communication includes means for performing each of the operations of FIG. 8. The aforementioned means may be one or more of the aforementioned components of the apparatus 902 and/or the processing system 914 of the apparatus 902 configured to perform the functions recited by the aforementioned means.

As described supra, the processing system 914 may include the TX Processor 268, the RX Processor 256, and the communication processor 259. As such, in one configuration, the aforementioned means may be the TX Processor 268, the RX Processor 256, and the communication processor 259 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), the UE comprising a plurality of antenna panels, wherein each antenna panel of the plurality of antenna panels comprises one or more reception units (RXUs), the method comprising:

receiving, from a base station, a configuration specifying an initial aggregated bandwidth $W_0$ carried on $C_0$ component carriers on which each active RXU of the UE is to receive signals;

determining a total processing bandwidth $W_{TOT}$ on which the UE is capable of receiving signals, wherein the $W_{TOT}$ is a hardware limit of the UE;

determining, based on the $W_{TOT}$ and the $W_0$, an initial hardware limit of $Q_0'$ RXUs that the UE is allowed to activate concurrently;

determining an adjusted aggregated bandwidth $W_1$ carried on $C_1$ component carriers on which each active RXU of the UE is to receive signals based on a channel condition between the UE and the base station, wherein the $W_1$ is different from the $W_0$;

determining, based on the $W_{TOT}$ and the $W_1$, an adjusted hardware limit of $Q_1'$ RXUs that the UE is allowed to activate concurrently, wherein a product of the $W_1$ and the $Q_1'$ is less than or equal to the $W_{TOT}$; and selecting one or more RXUs to be activated from the adjusted hardware limit of $Q_1'$ RXUs, wherein the selected one or more RXUs are distributed across at least two different antenna panels of the plurality of antenna panels.

2. The method of claim 1, further comprising:

sending, to a base station, an indication indicating at least one of $W_1$ and $C_1$ as UE Assistance Information (UAI).

3. The method of claim 1, further comprising:

sending, to the base station, an indication indicating at least one of $W_1$ and $C_1$;

subsequent to sending the indication, receiving, from the base station, a configuration specifying the adjusted aggregated bandwidth $W_1$ carried on the $C_1$ component carriers on which an RXU of the UE is to receive signals.

4. The method of claim 1, further comprising:

determining that T RXUs from the $Q_0'$ RXUs are to be activated, T being a positive integer and not greater than $Q_0'$; and receiving, at each of the T RXUs, signals transmitted from the base station on $C_0$ component carriers constituting the initial aggregated bandwidth $W_0$.

5. The method of claim 4, wherein the UE has Q RXUs in total, Q being an integer not less than $Q_0'$ and, the method further comprising:

receiving, at the Q RXUs, one or more reference signals transmitted from the base station;

measuring the one or more reference signals received at the Q RXU; and selecting the T RXUs from the Q RXUs based on the measurements.

6. The method of claim 5, wherein the respective one or more reference signals are in coarse beams transmitted from the base station.

7. The method of claim 5, wherein the respective one or more reference signals are in coarse beams received at the UE.

8. The method of claim 5, wherein the respective one or more reference signals are in fine beams transmitted from the base station.

9. The method of claim 5, wherein the respective one or more reference signals are in fine beams received at the UE.

10. The method of claim 1, further comprising:

prior to determining the adjusted aggregated bandwidth $W_1$, determining (a) that a channel condition between the base station and the UE is worse than a first threshold, (b) that a movement of the UE is faster than a second threshold, or (c) that a rotation of the UE is more rapid than a third threshold;

determining, based on $W_{TOT}$ and $W_1$, an adjusted hardware limit of $Q_1'$ RXUs that the UE is allowed to activate concurrently; and determining that $Q_1'$ is greater than a fourth threshold.

11. The method of claim 1, further comprising:

prior to determining the adjusted aggregated bandwidth $W_1$, determining (a) that a channel condition between the base station and the UE is better than a first threshold, (b) that a movement of the UE is slower than a second threshold, or (c) that a rotation of the UE is slower than a third threshold;

determining, based on $W_{TOT}$ and $W_1$, an adjusted hardware limit of $Q_1'$ RXUs that the UE is allowed to activate concurrently; and determining that $Q_1'$ is less than a fourth threshold.

12. An apparatus for wireless communication, the apparatus being a user equipment (UE), comprising:

a plurality of antenna panels, wherein each antenna panel of the plurality of antenna panels comprises one or more reception units (RXUs);

a memory; and at least one processor coupled to the memory and configured to:

receive, from a base station, a configuration specifying an initial aggregated bandwidth $W_0$ carried on $C_0$ component carriers on which each active RXU of the UE is to receive signals;

determine a total processing bandwidth $W_{TOT}$ on which the UE is capable of receiving signals, wherein the $W_{TOT}$ is a hardware limit of the UE;

determine, based on the $W_{TOT}$ and the $W_0$, an initial hardware limit of $Q_0'$ RXUs that the UE is allowed to activate concurrently;

determine an adjusted aggregated bandwidth $W_1$ carried on $C_1$ component carriers on which each active RXU of the UE is to receive signals based on a channel condition between the UE and the base station, wherein the $W_1$ is different from the $W_0$;

determine, based on the $W_{TOT}$ and the $W_1$, an adjusted hardware limit of $Q_1'$ RXUs that the UE is allowed to activate concurrently, wherein a product of the $W_1$ and the $Q_1'$ is less than or equal to the $W_{TOT}$; and select one or more RXUs to be activated from the adjusted hardware limit of $Q_1'$ RXUs, wherein the selected one or more RXUs are distributed across at least two different antenna panels of the plurality of antenna panels.

13. The apparatus of claim 12, wherein the at least one processor is further configured to:

send, to a base station, an indication indicating at least one of $W_1$ and $C_1$ as UE Assistance Information (UAI).

14. The apparatus of claim 12, wherein the at least one processor is further configured to:

send, to the base station, an indication indicating at least one of $W_1$ and $C_1$;

subsequent to sending the indication, receive, from the base station, a configuration specifying the adjusted aggregated bandwidth $W_1$ carried on the $C_1$ component carriers on which an RXU of the UE is to receive signals.

15. The apparatus of claim 12, wherein the at least one processor is further configured to:

determine that T RXUs from the $Q_0'$ RXUs are to be activated, T being a positive integer and not greater than $Q_0'$; and receive, at each of the T RXUs, signals transmitted from the base station on $C_0$ component carriers constituting the initial aggregated bandwidth $W_0$.

16. The apparatus of claim 15, wherein the UE has Q RXUs in total, Q being an integer not less than $Q_0'$ and, the method wherein the at least one processor is further configured to:

receive, at the Q RXUs, one or more reference signals transmitted from the base station;

measure the one or more reference signals received at the Q RXU; and select the T RXUs from the Q RXUs based on the measurements.

17. The apparatus of claim 12, wherein the at least one processor is further configured to:

prior to determining the adjusted aggregated bandwidth $W_1$, determine (a) that a channel condition between the base station and the UE is worse than a first threshold, (b) that a movement of the UE is faster than a second threshold, or (c) that a rotation of the UE is more rapid than a third threshold;

determine, based on $W_{TOT}$ and $W_1$, an adjusted hardware limit of $Q_1'$ RXUs that the UE is allowed to activate concurrently; and determine that $Q_1'$ is greater than a fourth threshold.

18. The method of claim 12, wherein the at least one processor is further configured to:

prior to determining the adjusted aggregated bandwidth $W_1$, determine (a) that a channel condition between the base station and the UE is better than a first threshold, (b) that a movement of the UE is slower than a second threshold, or (c) that a rotation of the UE is slower than a third threshold;

determine, based on $W_{TOT}$ and $W_1$, an adjusted hardware limit of $Q_1'$ RXUs that the UE is allowed to activate concurrently; and determine that $Q_1'$ is less than a fourth threshold.

19. A non-transitory computer-readable medium storing computer executable code for wireless communication of a user equipment (UE), the UE comprising a plurality of antenna panels, wherein each antenna panel of the plurality of antenna panels comprises one or more reception units (RXUs), the medium comprising code to:

receive, from a base station, a configuration specifying an initial aggregated bandwidth $W_0$ carried on $C_0$ component carriers on which each active RXU of the UE is to receive signals;

determine a total processing bandwidth $W_{TOT}$ on which the UE is capable of receiving signals, wherein the $W_{TOT}$ is a hardware limit of the UE;

determine, based on the $W_{TOT}$ and the $W_0$, an initial hardware limit of $Q_0'$ RXUs that the UE is allowed to activate concurrently;

determine an adjusted aggregated bandwidth $W_1$ carried on $C_1$ component carriers on which each active RXU of the UE is to receive signals based on a channel condition between the UE and the base station, wherein the $W_1$ is different from the $W_0$;

determine, based on the $W_{TOT}$ and the $W_1$, an adjusted hardware limit of $Q_1'$ RXUs that the UE is allowed to activate concurrently, wherein a product of the $W_1$ and the $Q_1'$ is less than or equal to the $W_{TOT}$; and select one or more RXUs to be activated from the adjusted hardware limit of $Q_1'$ RXUs, wherein the selected one or more RXUs are distributed across at least two different antenna panels of the plurality of antenna panels.

* * * * *